US009430890B2

(12) United States Patent
Ochiai et al.

(10) Patent No.: US 9,430,890 B2
(45) Date of Patent: Aug. 30, 2016

(54) IN-VEHICLE COMMUNICATION SYSTEM, MOBILE DEVICE, COMMUNICATION SYSTEM, AND COMMUNICATION METHOD

(71) Applicants: Mari Ochiai, Tokyo (JP); Akinori Taira, Tokyo (JP)

(72) Inventors: Mari Ochiai, Tokyo (JP); Akinori Taira, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 86 days.

(21) Appl. No.: 14/359,769

(22) PCT Filed: Oct. 10, 2012

(86) PCT No.: PCT/JP2012/076215
§ 371 (c)(1),
(2) Date: May 21, 2014

(87) PCT Pub. No.: WO2013/077100
PCT Pub. Date: May 30, 2013

(65) Prior Publication Data
US 2014/0300448 A1 Oct. 9, 2014

(51) Int. Cl.
G08B 19/00 (2006.01)
G07C 9/00 (2006.01)
B60R 25/24 (2013.01)
(Continued)

(52) U.S. Cl.
CPC .......... G07C 9/00182 (2013.01); B60R 25/24 (2013.01); B60R 25/406 (2013.01); G07C 9/00 (2013.01); H04W 52/0283 (2013.01); G07C 2009/0038 (2013.01);
(Continued)

(58) Field of Classification Search
None
See application file for complete search history.

(56) References Cited

U.S. PATENT DOCUMENTS 5,446,453 A    8/1995 Nagamoto et al.
5,838,257 A *  11/1998 Lambropoulos ... G07C 9/00309
                                              340/10.33
(Continued)

FOREIGN PATENT DOCUMENTS

JP    8-15355      2/1996
JP    2001-287624  10/2001
(Continued)

OTHER PUBLICATIONS

Extended European Search Report issued Jul. 20, 2015 in Patent Application No. 12851788.5.
(Continued)

Primary Examiner — Fekadeselassie Girma
Assistant Examiner — Thomas McCormack
(74) Attorney, Agent, or Firm — Oblon, McClelland, Maier & Neustadt, L.L.P.

(57) ABSTRACT

An in-vehicle device stores a Wake Up pattern, which notifies a mobile device of a start of communication, in an area before a data storage area of a frame and transmits the frame, the mobile device includes a modulation/demodulation circuit and a microcomputer that perform a predetermined reception process on a reception signal, a pattern determination circuit that, when the reception signal includes a Wake Up pattern, determines to start communication and activates the modulation/demodulation circuit and the microcomputer, a power detection circuit that detects power of the reception signal, and, when power is detected for a certain period of time or longer, activates the pattern determination circuit, and a Wake-Up control unit that activates the power detection circuit for a predetermined time with a constant period during a time period other than during communication.

4 Claims, 12 Drawing Sheets

(51) Int. Cl.
  *B60R 25/40* (2013.01)
  *H04W 52/02* (2009.01)
  *H04W 76/04* (2009.01)
(52) U.S. Cl.
  CPC ............ *G07C 2009/00365* (2013.01); *H04W 52/0229* (2013.01); *H04W 76/048* (2013.01); *Y02B 60/50* (2013.01)

(56) References Cited

U.S. PATENT DOCUMENTS

| | | | | |
|---|---|---|---|---|
| 8,248,204 | B2* | 8/2012 | Takeshima | G01V 15/00 340/10.1 |
| 8,847,731 | B2* | 9/2014 | Tieman | B60R 25/24 340/425.5 |
| 2005/0237161 | A1 | 10/2005 | Lee et al. | |
| 2008/0258870 | A1 | 10/2008 | Sugiura | |
| 2009/0256674 | A1 | 10/2009 | Lee et al. | |
| 2010/0301999 | A1* | 12/2010 | Carlson | G07C 9/00182 340/5.71 |
| 2011/0158303 | A1 | 6/2011 | Gauthier et al. | |
| 2012/0069893 | A1 | 3/2012 | Shirakata et al. | |

FOREIGN PATENT DOCUMENTS

| | | |
|---|---|---|
| JP | 2001-336321 | 12/2001 |
| JP | 2005-113608 | 4/2005 |
| JP | 4184375 | 11/2008 |
| JP | 4325698 | 9/2009 |
| JP | 2010-74737 A | 4/2010 |
| WO | WO 2010/032091 A1 | 3/2010 |
| WO | WO 2011/121690 A1 | 10/2011 |

OTHER PUBLICATIONS

International Search Report issued Jan. 15, 2013, in PCT/JP12/076215, filed Oct. 10, 2012.

* cited by examiner

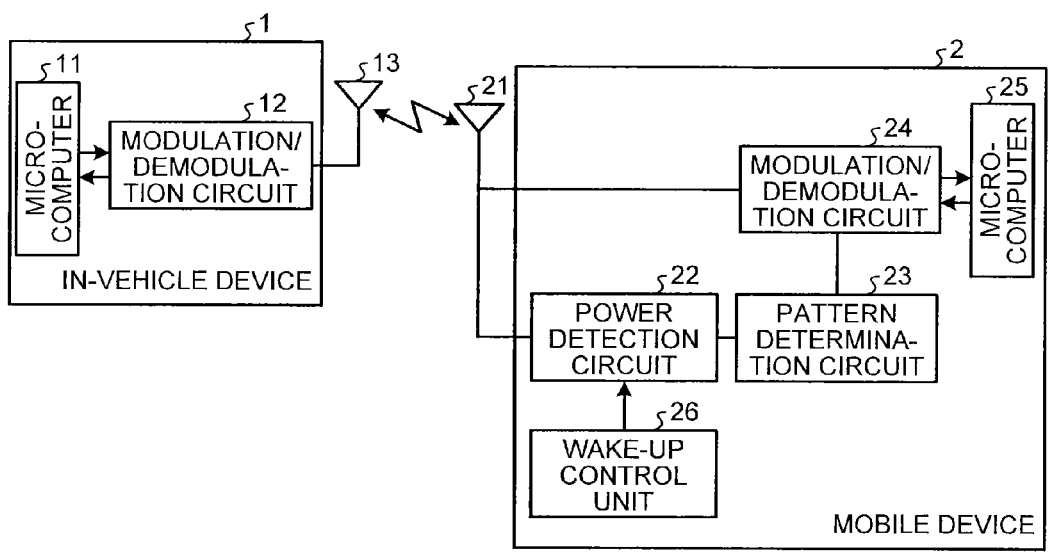

TRANSMISSION START TIMING OF READER

FIG.16
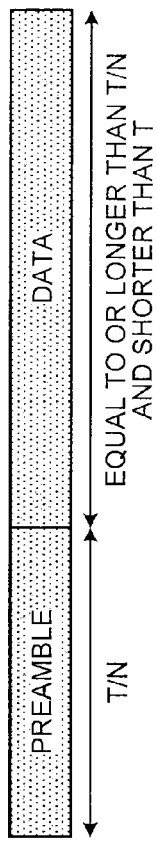
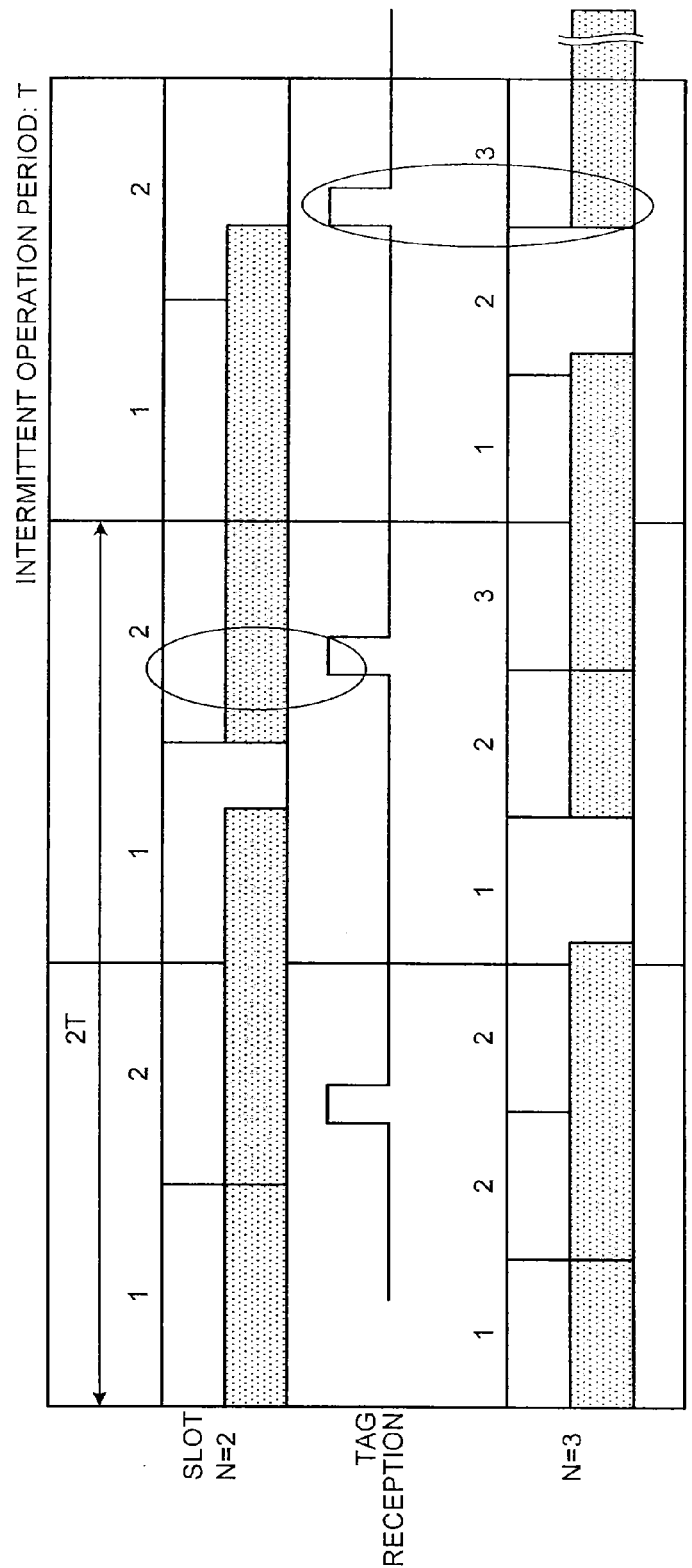

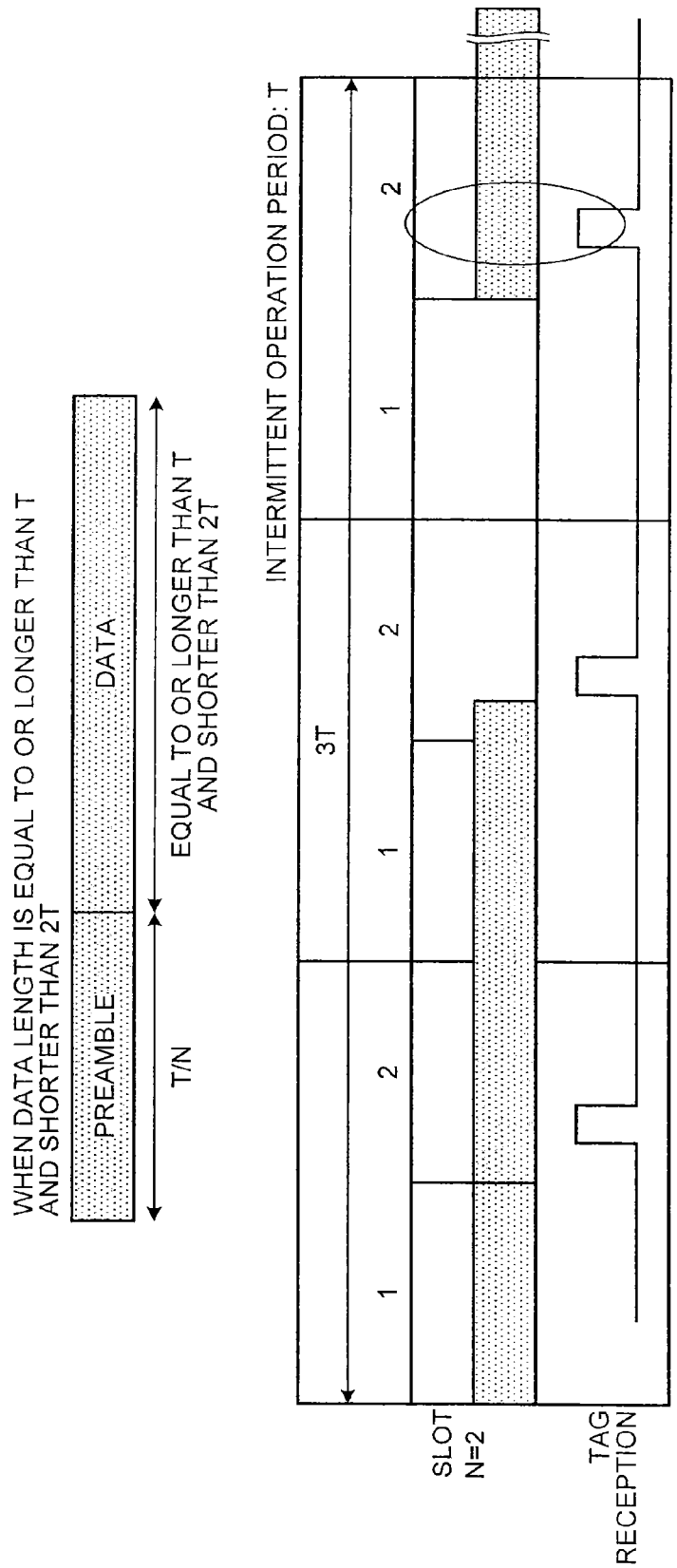

IN-VEHICLE COMMUNICATION SYSTEM, MOBILE DEVICE, COMMUNICATION SYSTEM, AND COMMUNICATION METHOD

FIELD

The present invention relates to an in-vehicle communication system, a mobile device, a communication system, and a communication method.

BACKGROUND

An electronic key system (a smart key system) by electronic control using an ID (IDentity) or security authentication has been put to practical use in order to improve convenience and operability with respect to locking and unlocking of the vehicle doors, engine start, and the like. The smart key system is a system that performs authentication of a mobile device carried by a user by an in-vehicle device that is incorporated in a vehicle via wireless communication, so as to control functions, such as locking and unlocking of the vehicle and engine start. The user can lock or unlock the vehicle and start the engine simply by carrying the mobile device.

The smart key system controls locking and unlocking of the vehicle and engine start by wireless communication between the mobile device and the in-vehicle device. Therefore, the mobile device needs to receive a signal, which is sent at any time from the in-vehicle device, without fail. To receive a signal at any time, it suffices that a receiver is on standby at all times. However, the power consumption increases if it is set on standby at all times. Because the mobile device is battery-operated, suppression of power consumption is effective for extending the battery life.

In a conventional smart key, to suppress power consumption of the mobile device, there is a system that has a power saving state where power consumption is lower than a communicable state, and shifts to the communicable state at a predetermined timing to realize the communication. For example, Patent Literature 1 describes a technique in which, during standby, the mobile device shifts to a power saving state for a time determined according to the user's operation of the mobile device, and, during authentication, the mobile device shifts to a power saving state for a predetermined time or a time notified by the in-vehicle device. Furthermore, Patent Literature 2 describes a method of suppressing power consumption by extending a transmission interval of signals from the in-vehicle device after authentication of the mobile device, thereby reducing the number of times transmission and reception are performed between the in-vehicle device and the mobile device.

CITATION LIST

Patent Literatures

Patent Literature 1: Japanese Patent No. 4325698
Patent Literature 2: Japanese Patent Application Laid-open No. 2001-336321

SUMMARY

Technical Problem

Patent Literature 1 describes a method of reducing power consumption at the time of standby during a communication time period from the start of communication to the end of vehicle control by sending a signal, which triggers the start of communication, from the mobile device. In Patent Literature 1, the mobile device is set to a power saving state by determining its status by the mobile device during communication or by control from the in-vehicle device. However, in the smart key system in which communication is started without the user operating the mobile device, because it is unknown when communication is started, the mobile device needs to always maintain a receivable state during a waiting time. Therefore, there is a problem of power consumption during a waiting time rather than the power consumption during the communication time period. For example, in a smart key system in which authentication is continued at regular intervals, there is a problem in that even if the method of Patent Literature 1 is applied, only the power consumption during the communication time period is reduced and the power consumption during a waiting time cannot be reduced.

Furthermore, Patent Literature 2 discloses a technique in which, in the smart key system, when the mobile device is continuously present within a certain range from the in-vehicle device, for example, after completion of first authentication of the mobile device, the transmission interval of signals from the in-vehicle device is extended. However, in Patent Literature 2, it is assumed that a receiver is always maintained in a state capable of receiving a signal from the in-vehicle device; therefore, although there is an effect of suppressing the power consumption by reducing the transmission and reception to/from the in-vehicle device, the power consumption when the mobile device is in a waiting state does not change.

The present invention has been achieved in view of the above, and an object of the present invention is to provide an in-vehicle communication system, a mobile device, a communication system, and a communication method that can reduce power consumption when a mobile device is in a waiting state.

Solution to Problem

In order to solve the above problems and achieve the object, the present invention is an in-vehicle communication system comprising an in-vehicle device that is incorporated in a vehicle and a mobile device that performs communication with the in-vehicle device, wherein the in-vehicle device stores a predetermined pattern, which notifies the mobile device of a start of communication, in an area before a data storage area of a frame that is transmitted to the mobile device at a time of a start of communication with the mobile device, and transmits the frame, the mobile device includes a reception processing unit that performs a predetermined reception process on a reception signal, a pattern determination unit that determines whether the reception signal includes the predetermined pattern by comparing the predetermined pattern held therein with the reception signal, and, when determining that the reception signal includes the predetermined pattern, determines to start communication and activates the reception processing unit, a power detection unit that detects power of the reception signal, and, when power is detected for a certain period of time or longer, activates the pattern determination unit, and a Wake-Up control unit that activates the power detection unit for a predetermined time with a constant period during a time period other than during communication with the in-vehicle device, and during a time period during which communication is not performed with the in-vehicle device, the reception processing unit and the pattern determination unit are set to a power saving state and the power detection unit is set to a power saving state during a time period other than the predetermined time during which the power detection unit is activated by the Wake-Up control unit.

Advantageous Effects of Invention

The in-vehicle communication system according to the present invention has an effect where power consumption when a mobile device is in a waiting state can be reduced.

BRIEF DESCRIPTION OF DRAWINGS

FIG. 1 is a diagram of an example of a configuration of an in-vehicle communication system according to a first embodiment.

FIG. 2 is a diagram of an example of a frame format used in the first embodiment.

FIG. 16 is a diagram of an example of signal transmission by a reader when the data length is equal to or longer than T/N and shorter than T.

FIG. 17 is a diagram of an example of signal transmission by a reader when the data length is equal to or longer than T and shorter than 2T.

DESCRIPTION OF EMBODIMENTS

Figure 3:
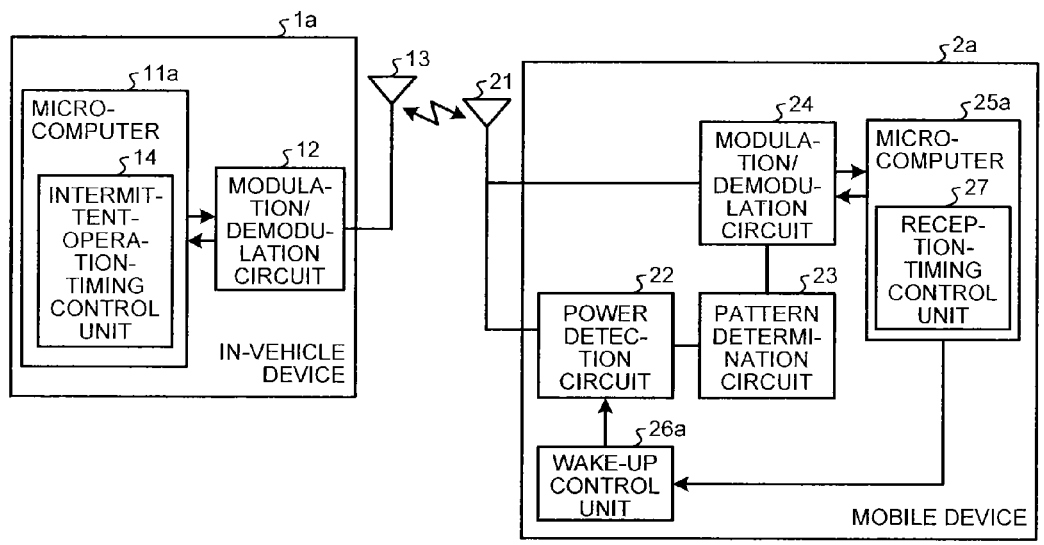
FIG. 3 is a diagram of an example of a configuration of an in-vehicle communication system according to a second embodiment.

Exemplary embodiments of an in-vehicle communication system, a mobile device, a communication system, and a communication method according to the present invention will be explained below in detail with reference to the accompanying drawings. The present invention is not limited to the embodiments.

First Embodiment

FIG. 1 is a diagram of an example of a configuration of an in-vehicle communication system according to a first embodiment of the present invention. The in-vehicle communication system according to the present embodiment includes an in-vehicle device 1 that is incorporated in a vehicle, such as an automobile, and a mobile device 2 that is movable by being carried by a user. The in-vehicle communication system according to the present embodiment is, for example, a smart entry system or a smart start system, and the in-vehicle device 1 includes a vehicle control unit (not shown) that performs locking and unlocking of vehicle doors and engine start. Alternatively, the in-vehicle device 1 is connected to a vehicle control unit provided separately from the in-vehicle device 1 and transmits a control signal for performing locking and unlocking of vehicle doors or engine start to the vehicle control unit.

As shown in FIG. 1, the in-vehicle device 1 according to the present embodiment includes a microcomputer 11 that performs signal processing on the side of the in-vehicle device, a modulation/demodulation circuit 12 that modulates transmission information to generate a transmission signal and demodulates a reception signal to generate reception information, and a transmission/reception antenna 13. The microcomputer 11 and the modulation/demodulation circuit 12 have a function as a reception processing unit that performs a reception process, such as demodulation and a predetermined signal reception process, on the reception signal and a function as a transmission processing unit that modulates transmission data to generate a transmission signal.

As shown in FIG. 1, the mobile device 2 according to the present embodiment includes a transmission/reception antenna 21, a power detection circuit (power detection unit) 22 that detects power of a reception signal to detect that a signal has been received, a pattern determination circuit (pattern determination unit) 23 that determines reception of a Wake Up pattern as a reception signal, a modulation/demodulation circuit 24 that modulates transmission information to generate a transmission signal and demodulates a reception signal to generate reception information, a microcomputer 25 that performs signal processing on the side of the mobile device 2, and a Wake-Up control unit 26 that controls the power detection circuit 22 to activate the power detection circuit 22 for a predetermined time at regular intervals (with a constant period) in a waiting state.

Operations of the present embodiment are explained next. In the mobile device 2, when the microcomputer 25 determines that the mobile device 2 is in the waiting state (for example, in a case where the end of communication is detected or a case where a signal has not been received for a certain period of time or longer), the microcomputer 25 shifts a reception function to a standby state at regular intervals. The mobile device 2 turns off the reception function (shifts to a power saving state) during a time period other than the standby state, and when having detected that a Wake Up pattern is received, activates all the circuits of the reception function, thereby suppressing power consumption. According to the present embodiment, in the standby state shifted at regular intervals, not all the reception functions but only the power detection circuit 22 is turned on (activated). The power detection circuit 22 then detects power of a reception signal received by the transmission/reception antenna 21. When power is detected for a certain period of time or longer (when power of the reception signal becomes a predetermined threshold or higher), the power detection circuit 22 determines that a signal frame has been received and activates (turns on) the pattern determination circuit 23.

When being activated, the pattern determination circuit 23 compares the reception signal with the Wake Up pattern held therein to determine whether the Wake Up pattern has been received. The Wake Up pattern is a known pattern stored in a frame and transmitted when the in-vehicle device 1 starts transmission (communication) of a signal. When determining that the Wake Up pattern has been received, the pattern determination circuit 23 activates (turns on) the modulation/demodulation circuit 24 and the microcomputer 25. By activating (Wake Up) respective units of the reception function in stages in this manner, for example, when momentary noise or the like is generated, the pattern determination circuit 23, the modulation/demodulation circuit 24, and the microcomputer 25 are not activated, thereby enabling to suppress power consumption. In this embodiment, the power detection circuit 22 activates the pattern determination circuit 23, and the pattern determination circuit 23 activates the modulation/demodulation circuit 24 and the microcomputer 25; however, a power-saving control unit that controls the power state of each unit may be additionally provided. In this case, when determining that a signal frame has been received, the power detection circuit 22 may notify the power-saving control unit of this matter and the power-saving control unit may activate the pattern determination circuit 23, and, when determining that a Wake Up pattern has been received, the pattern determination circuit 23 may notify the power-saving control unit of this matter and the power-saving control unit may activate the modulation/demodulation circuit 24 and the microcomputer 25.

FIG. 2 is a diagram of an example of a frame format used in the present embodiment. In the present embodiment, the mobile device 2 performs an intermittent operation in the waiting state (activates the power detection circuit 22 intermittently). Therefore, as shown in (1) in FIG. 2, a Wake Up pattern having a long time period is added to the top of the frame so that data can be received even when the intermittent operation is performed. It is desirable that the time period for transmitting the Wake Up pattern become equal to or longer than one period of the intermittent operation of the mobile device 2.

It is assumed that the Wake Up pattern is, for example, ASK (Amplitude Shift Keying)-modulated. When the Wake Up pattern is ASK-modulated, the pattern determination circuit 23 can be easily configured and can be realized by a circuit that consumes less power. Furthermore, in the ASK modulation, power can be maintained constant regardless of the pattern, for example, by adopting a Manchester code, and even when activation (Wake Up) of the reception function is performed in two stages as in the present embodiment, which are a power detection and a pattern detection, the power detection can be easily performed.

Further, as shown in (2) in FIG. 2, the top of the frame can be a CW (Continuous Wave) so that the power detection is further facilitated. In the present embodiment, there is no constraint on a modulation scheme of a data portion, and communication can be performed according to any modulation scheme, such as an FSK (Frequency Shift Keying) modulation or a PSK (Phase Shift Keying) modulation, without being limited to the ASK modulation. Demodulation of the modulation scheme other than the ASK modulation is performed by the modulation/demodulation circuit 24 that starts the operation after the pattern determination circuit 23 has detected the Wake Up pattern.

After the modulation/demodulation circuit 24 and the microcomputer 25 are activated, a signal transmitted from the in-vehicle device 1 is received and a similar process to that of a normal smart key system is performed. For example, when having received an authentication request from the in-vehicle device 1, the mobile device 2 transmits a response such as a code required for authentication. When transmitting a frame continuously after reception of the response from the mobile device 2, the in-vehicle device 1 does not need to add the Wake Up pattern (or the CW and the Wake Up pattern) to a start portion of the frame. When the reception of the signal transmitted from the in-vehicle device 1 is completed, the mobile device 2 shifts to the waiting state.

In the present embodiment, activation of the reception function is performed in two stages, which are activation of the pattern determination circuit 23 by a power detection and activation of the modulation/demodulation circuit 24 and the microcomputer 25; however, the reception function may be activated in one stage. For example, the pattern determination circuit 23, the modulation/demodulation circuit 24, and the microcomputer 25 may be simultaneously activated after the power detection. Alternatively, the pattern determination circuit 23 may be intermittently operated by the Wake-Up control unit 26 without being activated by the power detection, and when a Wake Up pattern is detected, the modulation/demodulation circuit 24 and the microcomputer 25 may be activated. Even in this case, by transmitting an ASK-modulated Wake Up pattern, the circuit configuration of the mobile device 2 can be simplified and power consumption can be suppressed.

As described above, according to the present embodiment, in the waiting state, the mobile device 2 activates the power detection circuit 22 intermittently, and when the power detection circuit 22 detects power of a reception signal for a certain period of time or longer, the power detection circuit 22 activates the pattern determination circuit 23 to detect the Wake Up pattern. When the Wake Up pattern is detected, the modulation/demodulation circuit 24 and the microcomputer 25 are further activated. Therefore, power consumption of the mobile device 2 in the waiting state can be reduced. Further, the mobile device 2 can receive a reception signal intermittently. Therefore, when an intermittent reception period and a time period for transmitting the Wake Up pattern are set appropriately, it can be prevented that a response time from the mobile device 2 to the in-vehicle device 1 becomes long even if the in-vehicle device 1 starts communication at any time, while realizing reduction of power consumption during a waiting time.

Second Embodiment

FIG. 3 is a diagram of an example of a configuration of an in-vehicle communication system according to a second embodiment of the present invention. The in-vehicle communication system according to the present embodiment includes an in-vehicle device 1a and a mobile device 2a. The in-vehicle device 1a is similar to the in-vehicle device 1 according to the first embodiment, except that the microcomputer 11 in the in-vehicle device 1 according to the first embodiment is replaced by a microcomputer 11a. The mobile device 2a is similar to the mobile device 2 according to the first embodiment, except that the microcomputer 25 and the Wake-Up control unit 26 in the mobile device 2 according to the first embodiment are respectively replaced by a microcomputer 25a and a Wake-Up control unit 26a. Constituent elements having functions similar to those of the first embodiment are denoted by the same reference signs as those of the first embodiment and redundant explanations thereof will be omitted.

As shown in FIG. 3, the microcomputer 11a in the in-vehicle device 1a according to the present embodiment includes an intermittent-operation-timing control unit 14. The microcomputer 25a according to the present embodiment includes a reception-timing control unit 27. The Wake-Up control unit 26a controls activation of the power detection circuit 22 based on a reception-timing control signal output from the reception-timing control unit 27 for controlling an intermittent reception timing.

Operations of the present embodiment are explained next. The method of transmitting the Wake Up pattern from the in-vehicle device 1a and the operation during a waiting time in the mobile device 2a are similar to those of the first embodiment. In the present embodiment, the intermittent reception timing during a waiting time can be changed.

Figure 4:
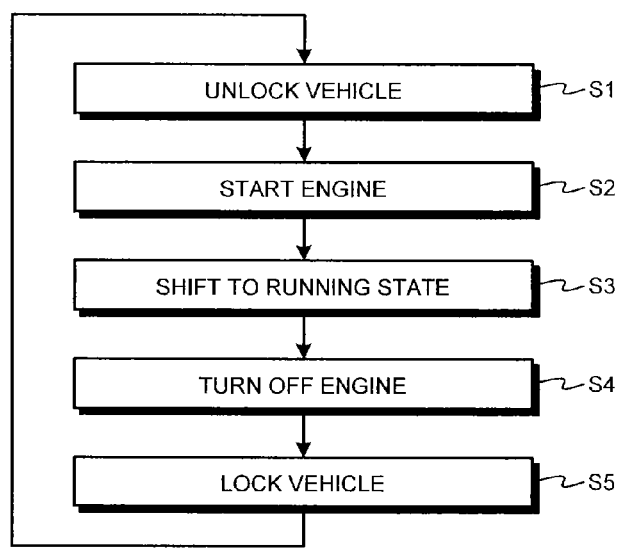
FIG. 4 is a flowchart of an example of an operation transition when a vehicle is used.

FIG. 4 is a flowchart of an example of an operation transition when a vehicle is used. First, in a state where a vehicle engine stops, vehicle doors are closed, and a user is outside the vehicle (that is, in an unused state of the vehicle), the mobile device 2a is in the waiting state. In the waiting state when the vehicle is not used, because it is unknown when such a state occurs that the user approaches the vehicle and wishes to unlock the vehicle, extension of the intermittent reception period leads to a delay of the response speed of the mobile device. Therefore, it is desirable not to extend the intermittent reception period in the waiting state when the vehicle is not used.

When the user uses the vehicle, an operation of unlocking the vehicle, that is, releasing the lock of the vehicle doors and the like is performed from the waiting state by communication between the mobile device 2a and the in-vehicle device 1a (Step S1), and thereafter, an engine start operation is performed (Step S2). The vehicle then shifts to a running state (Step S3) and an engine is turned off (Step S4). When the user leaves the vehicle, locking the vehicle is performed, that is, the vehicle doors and the like are locked (Step S5). Thereafter, the mobile device 2a becomes the waiting state, and at the time of using the vehicle, the operation from Step S1 is performed again. The operation procedure shown in FIG. 4 is only an example and the order of operations and the like are not limited to this example.

For example, at the time of engine start (Step S2), during running (Step S3), or the like, it is not required to perform communication frequently between the in-vehicle device 1a and the mobile device 2a. That is, the frequency of communication required is different depending on the operation state of the vehicle (engine start, during running, stopping, the vehicle not being used, and the like). Therefore, the intermittent-operation-timing control unit 14 of the in-vehicle device 1a determines the intermittent operation timing (the intermittent reception period or the like) based on the authentication result and the vehicle status, and notifies the mobile device 2a of the intermittent operation timing.

Figure 5:
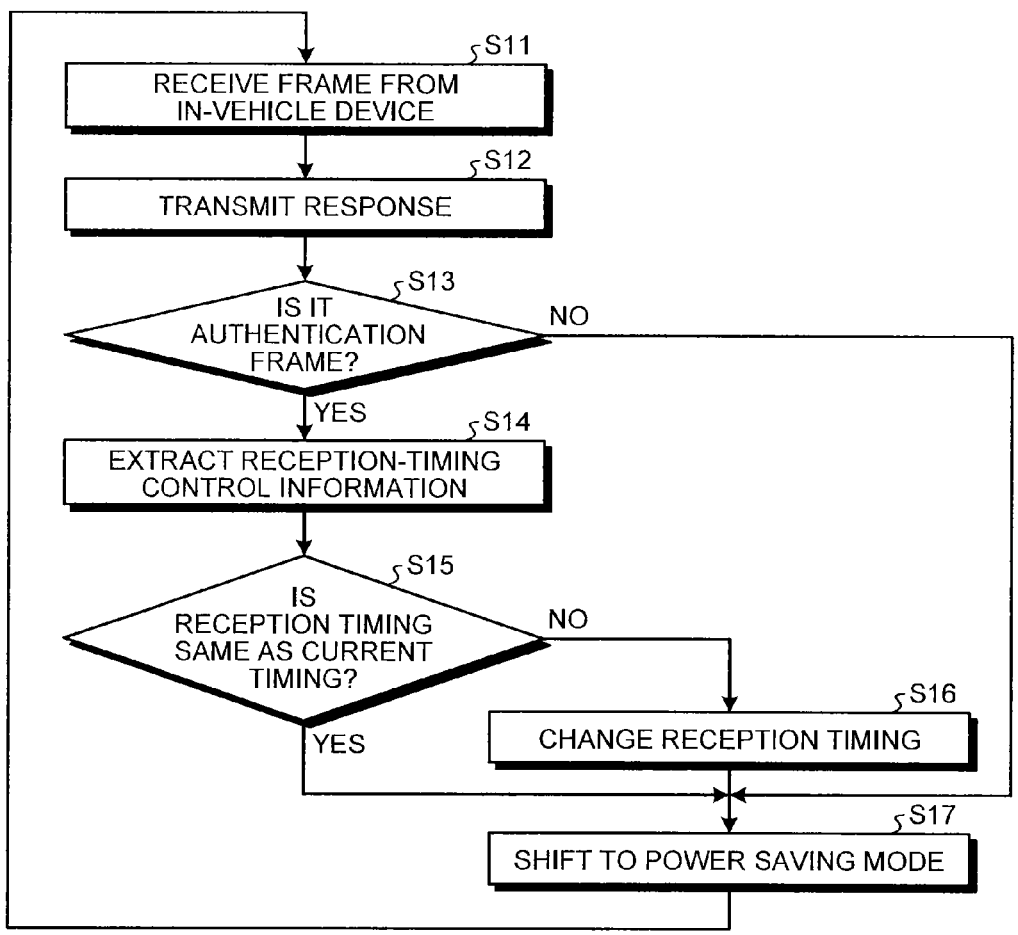
FIG. 5 is a flowchart of an example of an operation procedure of a mobile device according to the second embodiment.

FIG. 5 is a flowchart of an example of an operation procedure of the mobile device 2a according to the present embodiment. The mobile device 2a performs an intermittent reception in the waiting state based on the same procedure as that of the first embodiment, and upon reception of a Wake Up pattern from the in-vehicle device 1a, the mobile device 2a activates the modulation/demodulation circuit 24 and the microcomputer 25a. When a frame is received from the in-vehicle device 1a via the transmission/reception antenna 21 and the modulation/demodulation circuit 24 (Step S11), the microcomputer 25a of the mobile device 2a transmits a response with respect to an authentication request (Step S12). The microcomputer 25a also determines whether the received frame is an authentication request frame (Step S13). When the frame is the authentication request frame (YES at Step S13), the reception-timing control unit 27 extracts reception-timing control information put in a data portion of the received frame (Step S14).

The reception-timing control unit 27 determines whether the reception timing specified by the reception-timing control information is the same as the currently set reception timing of the intermittent reception (Step S15). When these reception timings are not the same (NO at Step S15), the reception-timing control unit 27 changes the currently set reception timing based on the reception-timing control information (Step S16). The mobile device 2a then shifts to a power saving mode (a standby state) (Step S17). Thereafter, when a frame is received, the mobile device 2a performs the process from Step S11. When it is determined at Step S13 that the frame is not the authentication frame (the authentication request frame) (NO at Step S13), and when it is determined at Step S15 that the reception timing specified by the reception-timing control information is the same as the currently set reception timing of the intermittent reception (YES at Step S15), the process proceeds to Step S17.

Figure 6:
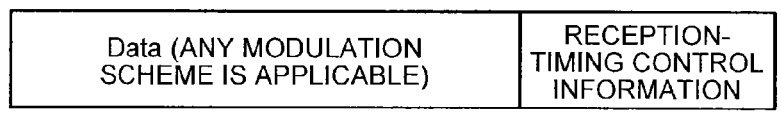
FIG. 6 is a diagram of an example of a format of a data portion of a frame transmitted by an in-vehicle device according to the second embodiment.

FIG. 6 is a diagram of an example of a format of a data portion of a frame transmitted by the in-vehicle device 1a according to the present embodiment. As shown in FIG. 6, the in-vehicle device 1a inserts the reception-timing control information into a part of the data portion of the frame and transmits the frame to the mobile device 2a. In FIG. 6, the reception-timing control information is inserted at the end of the data portion. However, the reception-timing control information may be inserted into any portion of the data portion. Furthermore, the reception-timing control information may be a time indicating a reception interval or information specifying some predetermined intervals. Further, when the period of the intermittent operation is to be extended, the period may be set to an integral multiple of the shortest period, and an integral multiple value may be specified in the reception-timing control information. Alternatively, a standard period of the intermittent operation is determined beforehand, and an amount to be increased or decreased with respect to the standard period may be notified as the reception-timing control information.

In FIG. 5, it is assumed that the reception-timing control information is inserted into an authentication frame. However, a frame into which the reception-timing control information is inserted is not limited to the authentication frame, and the reception-timing control information may be inserted into the last frame in a series of exchanges in the process of authentication of the mobile device 2a by the in-vehicle device 1a. When calling and authentication are performed in one transmission, the in-vehicle device 1a transmits the reception-timing control information simultaneously with the authentication frame, and if authentication is complete after transfer of data other than calling and authentication, the reception-timing control information is stored in the last transmission frame in a series of the authentication process and transmitted. As a frame configuration, an area of the reception-timing control information may be secured in all the frames.

Figure 7:
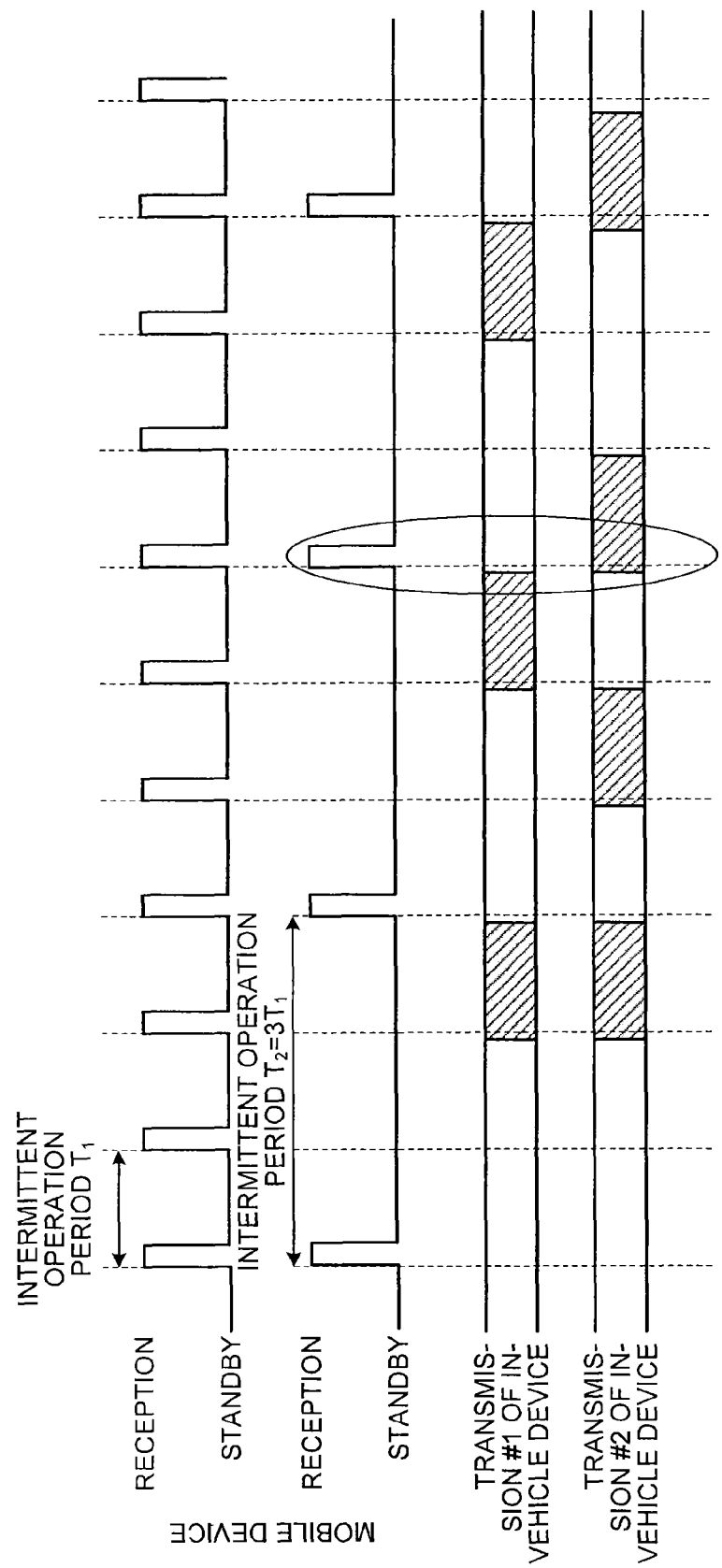
FIG. 7 is a diagram of an example of a reception timing of the mobile device and a transmission timing of the in-vehicle device according to the second embodiment.

As an example, a case where the period of the intermittent operation is extended to three times after engine start is explained. FIG. 7 is a diagram of an example of a reception timing of the mobile device 2a and a transmission timing of the in-vehicle device 1a according to the present embodiment. The first tier of FIG. 7 represents a reception timing when the period of the intermittent operation (the intermittent operation period) is set to $T_1$ in the mobile device $2a$, and the second tier of FIG. 7 represents a reception timing when the period of the intermittent operation (the intermittent operation period) is set to $T_2=3T_1$ in the mobile device $2a$. It is assumed that switching from the intermittent operation period $T_1$ to the intermittent operation period $T_2$ is performed prior to a time point at the left end of FIG. 7 by a notification using the reception-timing control information, and the mobile device $2a$ performs the reception operation at the timing shown in the second tier. The reception timing before the switching is shown in the first tier for a comparison.

On the other hand, even when the in-vehicle device $1a$ performs a change of extending the intermittent operation period of the mobile device $2a$, when it is assumed that transmission to the mobile device $2a$ is performed at the same timing as that before the change, a useless transmission time increases for the in-vehicle device $1a$. Therefore, when extending the intermittent operation period of the mobile device $2a$, it is considered to extend the transmission period of the in-vehicle device $1a$ itself. An example of the transmission timing when the in-vehicle device $1a$ transmits a frame with the period $T_{er}$ matched with the intermittent operation period changed from $T_1$ to $T_2$, is shown in the third tier of FIG. 7 as transmission #1 of the in-vehicle device $1a$. The hatched time periods indicate a time period for transmitting the frame. As can be understood from a comparison between the second tier and the third tier in FIG. 7, when the transmission period of the in-vehicle device $1a$ is $T_2$, there is no time zone in which the transmission time of the in-vehicle device $1a$ and the reception time of the mobile device $2a$ match with each other, and thus communication between the in-vehicle device $1a$ and the mobile device $2a$ cannot be performed. The length of one transmission frame can be extended in accordance with the extension of the transmission period of the in-vehicle device $1a$. However, when the frame becomes long, the reception by the mobile device $2a$ takes time, and thus it is not preferable from the viewpoint of power consumption.

Therefore, in the present embodiment, it is assumed that the in-vehicle device $1a$ transmits a frame without changing the length of the frame even if the period is changed. However, in this case, when the transmission period of the in-vehicle device $1a$ is simultaneously changed to $T_2$, as shown in FIG. 7, the mobile device $2a$ may not be able to receive the frame. Therefore, as shown in the fourth tier in FIG. 7 as transmission #2 of the in-vehicle device $1a$, a frame is transmitted in all of the periods $T_2$ with a plurality of periods with which a frame is transmitted at different timings within the period $T_2$. In the example shown in FIG. 7, in the first intermittent operation period $T_2$ at the left end, a frame with a length of the period $T_1$ is transmitted from a point in time when approximately two-thirds of $T_2$ has passed from the start of the intermittent operation period $T_2$, a frame with a length of the period $T_1$ is transmitted from a point in time when approximately one-third of $T_2$ has passed from the start of the second intermittent operation period $T_2$, and a frame with a length of the period $T_1$ is transmitted approximately at the time of the start of the third intermittent operation period $T_2$. In this manner, because the in-vehicle device $1a$ transmits timing frames shifted from each other by one third of $T_2$ (that is, in this case, by $T_1$), the mobile device $2a$ can receive the frame at any of the timings if transmission is performed three times. In the example shown in FIG. 7, the mobile device $2a$ can receive the frame in the third transmission enclosed by an ellipse. When the intermittent operation period is changed to a short period, the transmission period may be changed without providing a time period for shifting the transmission timing.

The mobile device $2a$ transmits a response to the in-vehicle device $1a$, upon reception of the transmission frame from the in-vehicle device $1a$. The in-vehicle device $1a$ performs transmission with a period matched with the timing when the response is obtained. In the example shown in FIG. 7, because the response can be obtained in the transmission from approximately the start of the intermittent operation period $T_2$, from the next transmission, the in-vehicle device $1a$ transmits a frame with the period $T_2$ from approximately the start of the intermittent operation period $T_2$. By performing retransmission, for example, at the time of waiting for a response at all the timings in this manner, it is possible to distinguish between a case where the mobile device does not respond and a case where the transmission timing does not match the reception timing. Operations of the present embodiment other than those described above are similar to those of the first embodiment.

In this manner, in the present embodiment, the period of the intermittent operation of the mobile device $2a$ can be changed according to a notification from the in-vehicle device $1a$. Therefore, power consumption of the mobile device $2a$ can be reduced by extending the period of the intermittent operation when communication is not performed frequently, for example, during running of the vehicle.

Third Embodiment

Figure 8:
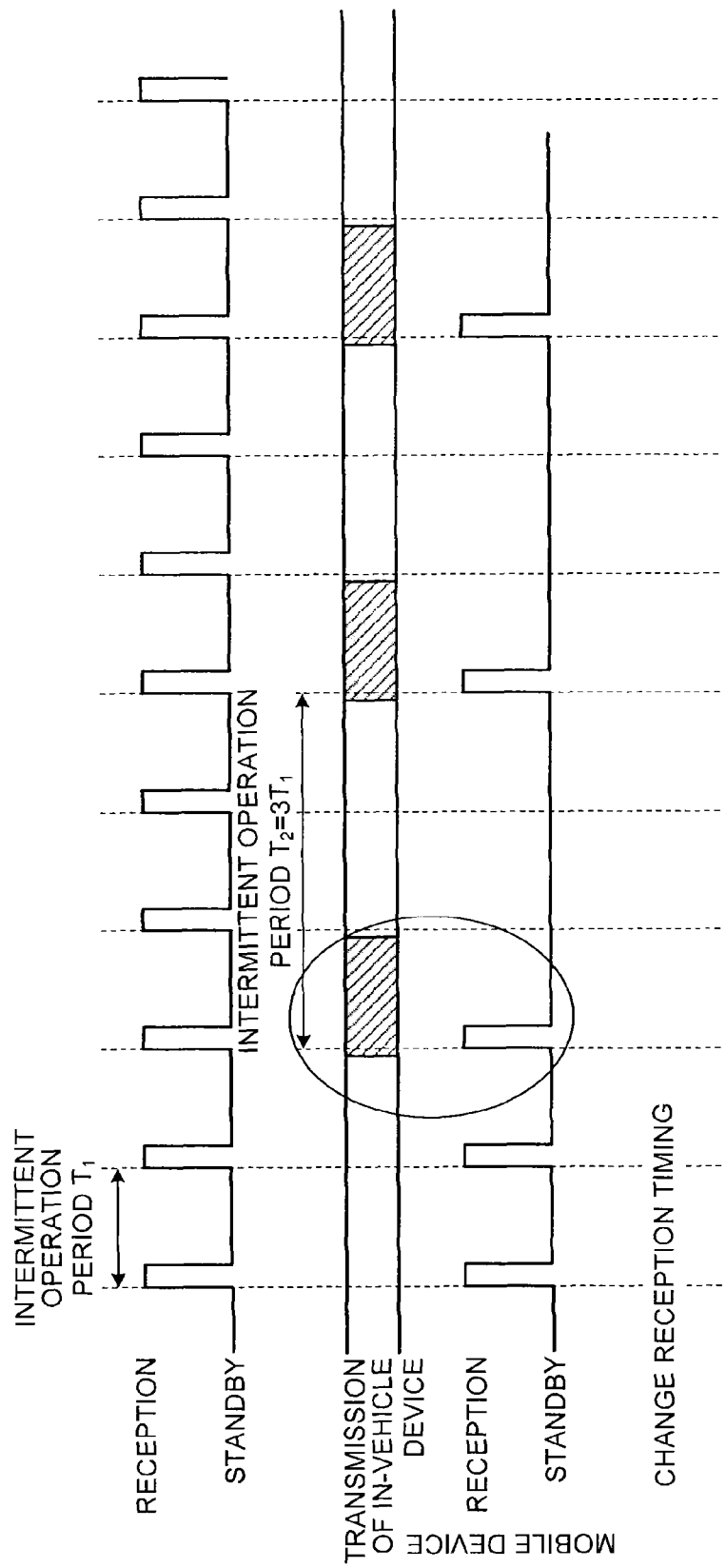
FIG. 8 is a diagram of an example of a reception timing of a mobile device and a transmission timing of an in-vehicle device according to a third embodiment.

FIG. 8 is a diagram of an example of a reception timing of the mobile device $2a$ and a transmission timing of the in-vehicle device $1a$ of an in-vehicle communication system according to a third embodiment of the present invention. Configurations of the in-vehicle communication system according to the present embodiment are similar to those of the second embodiment. Configurations of the mobile device $2a$ and the in-vehicle device $1a$ according to the present embodiment are similar to those of the second embodiment.

In the present embodiment, as in the second embodiment, the period of the intermittent operation of the mobile device $2a$ can be changed based on the reception-timing control information stored in the frame transmitted from the in-vehicle device $1a$. In the present embodiment, the mobile device $2a$ adjusts the reception timing so that the transmission timing and the reception timing are matched with each other.

For example, as in the example shown in FIG. 7 of the second embodiment, an example of changing the intermittent operation period from $T_1$ to $T_2$-$3T_1$ after engine start is explained. It is assumed that the mobile device $2a$ receives the reception-timing control information that instructs the intermittent operation period at a point in time shown at the left end in FIG. 8. In the present embodiment, the intermittent operation period is not changed immediately after having received the reception-timing control information, and the intermittent operation period remains unchanged at $T_1$ until the first frame transmitted from the in-vehicle device $1a$ is received after having received the reception-timing control information. Upon reception of the first frame, a starting point of one period is adjusted so that the timing when the frame is received becomes a reception time period to change the intermittent operation period to $T_2$. However, when the period is switched from a long period to a minimum period, the transmission period of the in-vehicle device 1a is switched immediately upon reception of the notification by the reception-timing control information. Operations of the present embodiment other than those described above are similar to those of the second embodiment.

In this manner, in the present embodiment, the intermittent operation period can be changed as in the second embodiment. After receiving the notification to extend the intermittent operation period, the mobile device 2a does not change the intermittent operation period until the first frame is received from the in-vehicle device 1a. After receiving the first frame, the mobile device 2a sets the starting point of one period of the intermittent operation period and changes the intermittent operation period to $T_2$ so that the transmission frame from the in-vehicle device 1a can be received based on the reception timing of the first frame. Therefore, when communication does frequently occur, for example, during running of the vehicle, power consumption of the mobile device 2a can be reduced by extending the period of the intermittent operation, and the mobile device 2a can communicate with the in-vehicle device 1a even after the intermittent operation period is changed.

Fourth Embodiment

Figure 9:
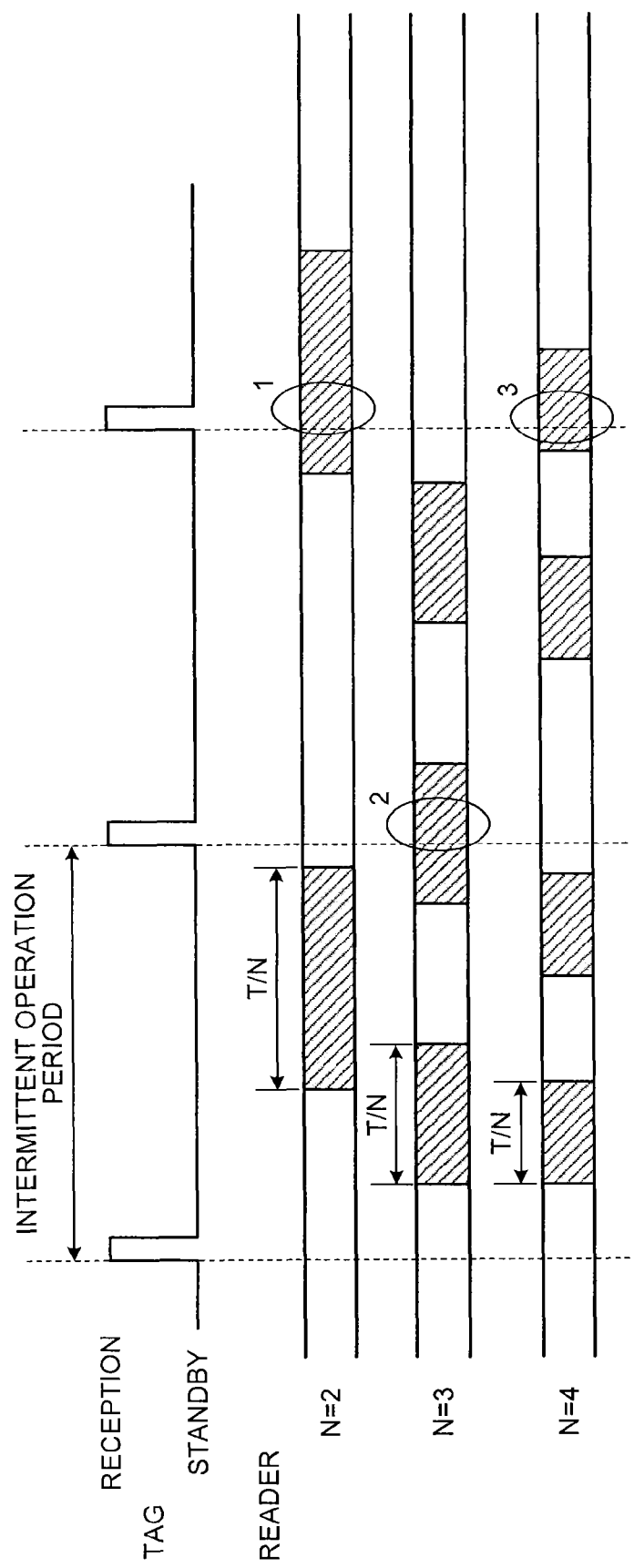
FIG. 9 is a diagram of an example of a reception timing of a tag and a transmission timing of a reader according to a fourth embodiment.

FIG. 9 is a diagram of an example of a reception timing of a tag and a transmission timing of a reader of a communication system according to a fourth embodiment of the present invention. In the present embodiment, the communication system including the tag as a mobile device and the reader as a master device is explained.

A system in which the reader detects a tag in a communication area when necessary is explained here. As such a system, for example, a system in which a person holds a tag and a reader arranged at various places detects the position thereof, or a system in which a reader manages entering and leaving to/from a high-security area by authenticating a tag can be assumed. Although the tag is explained as an active tag, the tag is not limited to an active tag.

In such a system, because it is not certain when the reader makes an inquiry to the tag, the tag is usually in the waiting state. However, when the tag is in the waiting state at all times, power consumption from the battery is large, and thus an intermittent operation in which the reception operation is performed intermittently is performed in some cases. Conventionally, when the intermittent operation is performed, a method in which synchronization between the reader and the tag is achieved and the tag performs a reception matched with the time at which the reader performs transmission, or a method in which a reader transmits a frame longer than an intermittent operation period so that the tag reliably receives the frame is adopted.

In the application assumed in the present embodiment, because communication is not necessarily required to be performed frequently and a simple device is preferred, it is effective for reducing the power consumption from the battery by the tag that the reader and the tag (the active tag) can operate in a non-synchronized manner (in which the intermittent operation period is not synchronized). However, most frequency bands frequently used in a tag system are defined by the specified low power and are thus limited in the continuous transmission time. When the transmission timing of the reader and the reception timing of the tag are not synchronized with each other, one transmission is made long so that the tag can receive a frame. However, if the intermittent operation period of the tag becomes long, one transmission becomes long; therefore, it is difficult to set an intermittent operation period of the tag long considering the limitation on the continuous transmission time.

In the present embodiment, an explanation will be given of a control method with which when the intermittent operation period is long and not synchronized, even if a reader transmits a frame shorter than the intermittent operation period, a tag can receive the frame.

FIG. 9 illustrates an example in which the reader transmits a frame with a frame length corresponding to a transmission time of T/N (N is an integer equal to or larger than 2) with respect to an intermittent operation period T of the tag. The intermittent operation period and the intermittent operation status of the tag are shown in the upper tier. The tag becomes a state capable of receiving the frame for a certain period of time with the intermittent operation period T (a reception processing unit is in an activated state), and the reception processing unit is in a standby state during the other times. The second, third, and fourth tiers in FIG. 9 respectively represent a transmission timing of the reader when N=2, 3, and 4. While the case where N=2, 3, and 4 is shown in FIG. 9, the value of N is not limited thereto.

As shown in FIG. 9, when it is assumed that the frame has a length corresponding to T/N with respect to the intermittent operation period T of the tag, the tag can surely receive the frame within the time 2T by performing frame transmission N times within the time 2T.

Figure 10:
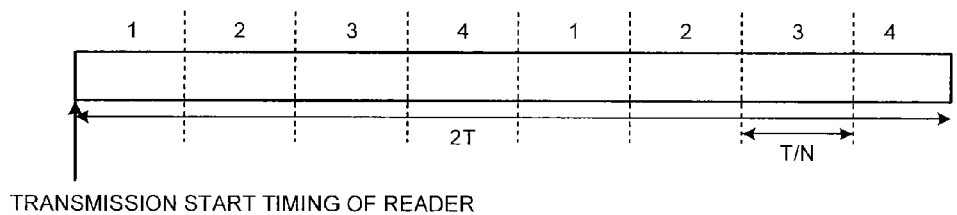
FIG. 10 is a diagram of an example of frame transmission and slots according to the fourth embodiment.

FIG. 10 is a diagram of an example of frame transmission and slots according to the present embodiment. FIG. 10 is an example of N=4. As shown in FIG. 10, the reader cuts the range of the time 2T from the transmission start at a timing of every T/N to obtain 2N slots and allocates numbers from 1 to N sequentially to the slots for each T. The reader transmits a frame at a timing such that a frame is surely transmitted at least once to each of the slots of all the numbers within the time 2T. The reader assumes that the tag can receive a certain frame among frames transmitted within the time 2T, and performs retransmission in one set of the time 2T. When transmission and reception of data is performed many times between the reader and the tag, the reader performs transmission as described above only for the first transmission. Thereafter, the reader can perform transmission matched with the timing when a response from the tag is received.

By such transmission from the reader, even when the reader and the tag are not synchronized with each other and a frame shorter than the intermittent operation period is used, communication can be successfully performed within the time 2T.

Furthermore, N can be made variable according to the status, and N can be increased when the communication frequency can be low and N can be decreased when the communication frequency is high.

There is no particular limitation on the configurations of the reader and the tag according to the present embodiment. However, the configurations of the reader and the tag may be the same as those of the in-vehicle device and the mobile device according to any of the first to third embodiments, respectively, and the reception processing unit of the tag may be activated in one stage or other stages by using a Wake Up signal.

Fifth Embodiment

A configuration of an in-vehicle communication system that can reduce power consumption of a mobile device has been disclosed in the first embodiment. The in-vehicle communication system is required to operate normally under the condition that noise, such as device noise from a vehicle and ambient noise from peripheral devices in a coin-operated parking, is large. Specifically, large noise is expected in a low frequency band, and reduction of an operation SINR (signal-to-interference noise ratio) is required. In a fifth embodiment of the present invention, an in-vehicle communication system that realizes reduction of the operation SINR by applying a spread spectrum is explained. Constituent elements having functions similar to those of the first embodiment are denoted by the same reference signs as those of the first embodiment and redundant explanations thereof will be omitted.

Figure 11:
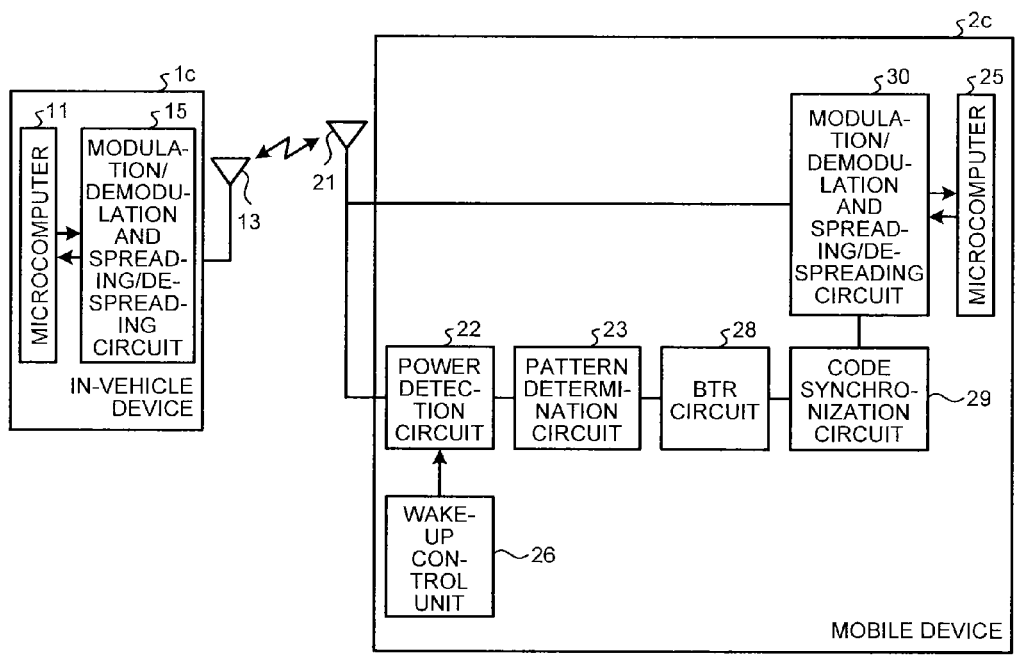
FIG. 11 is a diagram of an example of a configuration of an in-vehicle communication system according to a fifth embodiment.
Figure 12:
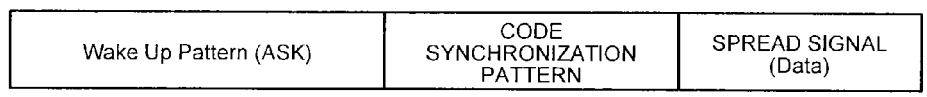
FIG. 12 is a diagram of an example of a frame format assumed in the fifth embodiment.

FIG. 11 is a diagram of an example of a configuration of the in-vehicle communication system according to the present embodiment. FIG. 12 is a diagram of an example of a frame format assumed in the present embodiment. The in-vehicle communication system according to the present embodiment includes an in-vehicle device 1c and a mobile device 2c. The in-vehicle device 1c is similar to the in-vehicle device 1 according to the first embodiment except that the modulation/demodulation circuit 12 according to the first embodiment is replaced by a modulation/demodulation and spreading/despreading circuit 15. The mobile device 2c is similar to the mobile device 2 according to the first embodiment except that the modulation/demodulation circuit 24 according to the first embodiment is replaced by a modulation/demodulation and spreading/despreading circuit (despreading unit) 30, and a BTR circuit 28 and a code synchronization circuit 29 are added.

Operations of the present embodiment are explained with reference to FIGS. 11 and 12. In the mobile device 2c, when determining that the mobile device is in the waiting state (for example, in a case where the end of communication is detected or a case where a signal has not been received for a certain period of time or longer), the microcomputer 25 causes the reception function to shift to the standby state (reception standby) at regular intervals. The microcomputer 25 turns off the reception function (a power saving state) during a time period other than the standby state, and when having detected that a Wake Up pattern is received, sequentially activates the reception functions, thereby suppressing power consumption. This operation is similar to that of the first embodiment.

In the in-vehicle device 1c, a signal is transmitted in a frame format shown in FIG. 12 by the microcomputer 11 and the modulation/demodulation and spreading/despreading circuit 15. Following the Wake Up pattern ASK-modulated according to the frame format shown in FIG. 12, a code synchronization pattern (a known signal sequence) for code synchronization and data spread by a spread code (a spread signal) are transmitted. Generally, a unique pattern that is not multiplied by the spread code is used as the code synchronization pattern. However, the spread code same as that of the data portion may be used.

In the mobile device 2c, in the waiting state, the power detection circuit 22 is activated for a predetermined time at regular intervals (with a constant period). The power detection circuit 22 detects power of a reception signal (a reception signal in the frame format shown in FIG. 12) received by the transmission/reception antenna 21. When power is detected for a certain period of time or longer (when power of the reception signal becomes a predetermined threshold or higher), the power detection circuit 22 determines that a signal frame has been received and activates (turns on) the pattern determination circuit 23. When being activated, the pattern determination circuit 23 compares the reception signal with the Wake Up pattern held therein to determine whether the Wake Up pattern has been received. When determining that the Wake Up pattern has been received, the pattern determination circuit 23 activates the BTR (Bit Timing Recovery) circuit 28 and the code synchronization circuit 29. Alternatively, instead of activating the pattern determination circuit 23 and the code synchronization circuit 29 in stages, when the power detection circuit 22 detects power for a certain period of time or longer, the pattern determination circuit 23 and the code synchronization circuit 29 may be activated.

The activated BTR circuit 28 generates a timing required for bit decision of the reception signal and inputs the timing to the code synchronization circuit 29. The code synchronization circuit 29 compares the generated reception pattern with the pre-held code synchronization pattern at the timing input from the BTR circuit 28, and when the code synchronization pattern is detected, activates the modulation/demodulation and spreading/despreading circuit 30. The activated modulation/demodulation and spreading/despreading circuit 30 starts demodulation and a despreading process of the spread data. In some cases, the BTR circuit 28 is not required according to a modulation scheme of the code synchronization pattern. In this case, the pattern determination circuit 23 activates only the code synchronization circuit 29 to perform a code synchronization process.

In the present embodiment, when the Wake Up pattern is received, the pattern determination circuit 23 activates the code synchronization circuit 29. Therefore, the code synchronization circuit 29 (or the code synchronization circuit 29 and the BTR circuit 28) corresponds to the reception processing unit according to the first embodiment. Activation in stages is performed such that the reception processing unit is activated, and when the code synchronization circuit 29 detects the code synchronization pattern, the modulation/demodulation and spreading/despreading circuit 30 is activated.

As described above, according to the present embodiment, in the case of adopting the spread spectrum system, in a state where the mobile device 2c is in the waiting state, the power detection circuit 22 is activated intermittently, and when the power detection circuit 22 detects power of the reception signal for a certain period of time or longer, the pattern determination circuit 23 is activated to detect the Wake Up pattern. When the Wake Up pattern is detected, the BTR circuit 28 and the code synchronization circuit 29 are further activated, and when the code synchronization circuit 29 detects the code synchronization pattern, the modulation/demodulation and spreading/despreading circuit 30 is activated. Therefore, effects similar to those of the first embodiment can be obtained while the operation SINR is reduced according to the spread spectrum system. In the present embodiment, the BTR circuit 28, the code synchronization circuit 29, and the modulation/demodulation and spreading/despreading circuit 30 are activated in two stages (the BTR circuit 28 and the code synchronization circuit 29 are activated first, and when the code synchronization circuit 29 detects the code synchronization pattern, the modulation/demodulation and spreading/despreading circuit 30 is activated); therefore, lower power consumption can be realized. However, the BTR circuit 28, the code synchronization circuit 29, and the modulation/demodulation and spreading/despreading circuit 30 may be activated in one stage.

Sixth Embodiment

There are various systems (parameters) for a spread spectrum described in the fifth embodiment. For example, a system in which a spreading factor is changed to reduce the operation SINR by decreasing a transmission rate, or a multilevel modulation-type spread system (M-array SS or the like) for improving an interference immunity can be considered. In a sixth embodiment, a configuration and operations when a plurality of spread systems described above are present in a mixed manner is explained.

Figure 13:
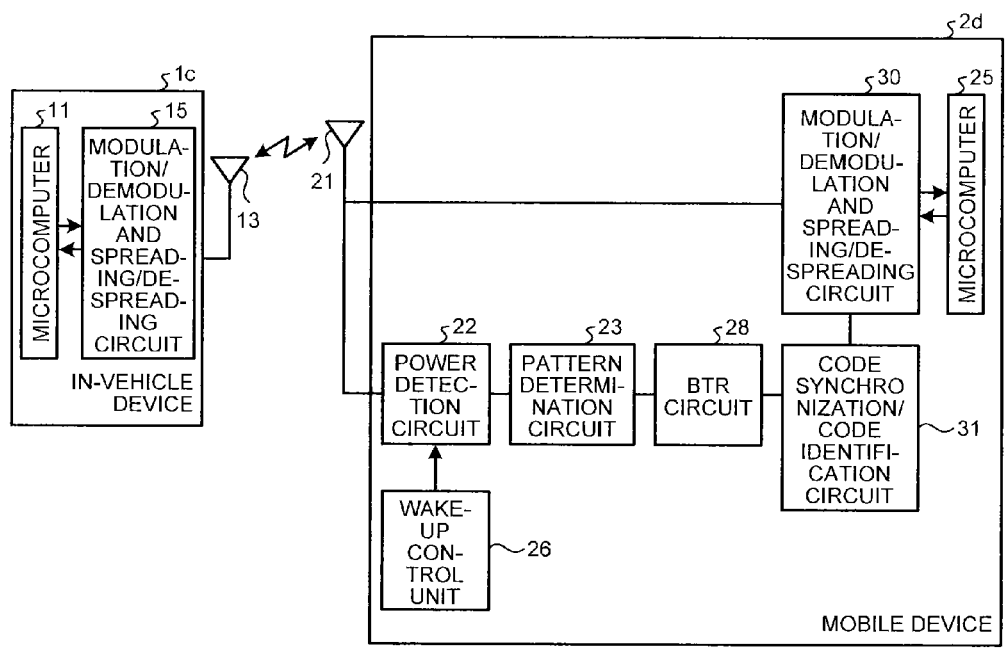
FIG. 13 is a diagram of an example of a configuration of an in-vehicle communication system according to a sixth embodiment.

FIG. 13 is a diagram of an example of a configuration of an in-vehicle communication system according to the present embodiment. The in-vehicle communication system according to the present embodiment includes the in-vehicle device 1c having the same configuration as that of the fifth embodiment, and a mobile device 2d. The mobile device 2d is similar to the mobile device 2c according to the fifth embodiment except that the code synchronization circuit 29 of the mobile device 2c according to the fifth embodiment is replaced by a code synchronization/code identification circuit (code synchronization circuit) 31.

Figure 14:
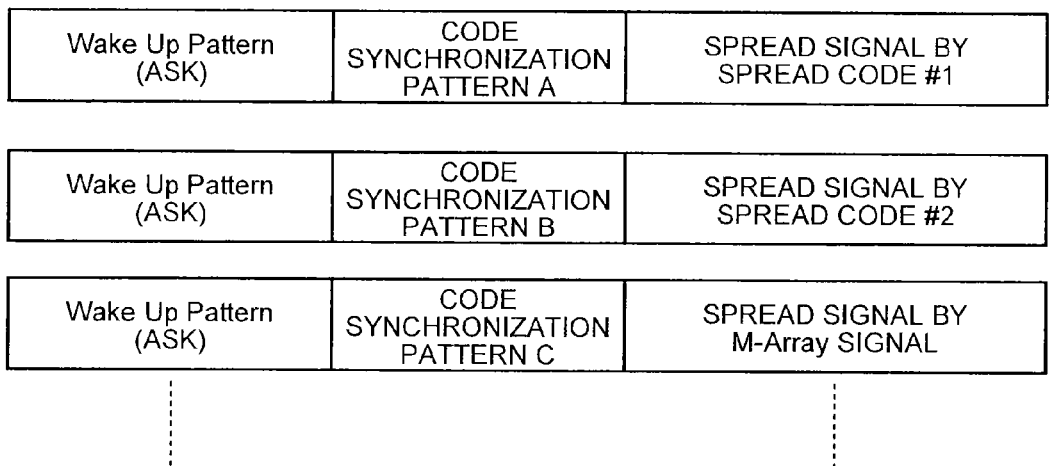
FIG. 14 is a diagram of examples of a frame format according to the sixth embodiment.

FIG. 14 is a diagram of examples of a frame format used in the present embodiment. FIG. 14 illustrates an example in which a spread spectrum based on a spread code #1, a spread spectrum based on a spread code #2, and a spread spectrum based on the M-array SS are present in a mixed manner. While an example where three spread spectrum systems are present in a mixed manner is shown in FIG. 14, the number of spread spectrum systems present in a mixed manner and the type of the spread spectrum system are not limited to the example shown in FIG. 14.

The in-vehicle device 1c selects a spread system from a plurality of spread spectrum systems to spread data by the selected spread system, and transmits a signal to the mobile device 2d in any of the frame formats shown in FIG. 14 (any one of the frame formats in the first to third lines). At this time, a code synchronization pattern linked to (associated with) the spread system beforehand is selected to construct a transmission frame.

In the mobile device 2d, the Wake Up procedure similar to that in the fifth embodiment is performed, and the pattern determination circuit 23 activates the BTR circuit 28 and the code synchronization/code identification circuit 31 when determining that the Wake Up pattern is received. The code synchronization/code identification circuit 31 compares the code synchronization patterns held therein with a reception signal to detect a code synchronization pattern matched with the reception signal. The code synchronization/code identification circuit 31 notifies the modulation/demodulation and spreading/despreading circuit 30 of the detected code synchronization pattern. The modulation/demodulation and spreading/despreading circuit 30 performs despreading by the spread system corresponding to the code synchronization pattern to demodulate data. Accordingly, despreading can be performed by using the spread system same as that of the transmission side.

As described above, in the present embodiment, the in-vehicle communication system is compatible with a plurality of spread spectrum systems. Accordingly, the code synchronization pattern is preset for each spread spectrum system, and the in-vehicle device 1c transmits data by using the code synchronization pattern corresponding to the spread system to be applied. The mobile device 2d performs despreading by the spread system in accordance with the code synchronization pattern. Therefore, the present embodiment can correspond to various signal rates and the operation SINR, in addition to the effects of the fifth embodiment.

Seventh Embodiment

A communication system according to a seventh embodiment is explained next. In the present embodiment, the communication system including a tag as a mobile device and a reader as a master device as in the fourth embodiment is explained. In the present embodiment, as in the fourth embodiment, the reader detects an active tag in a communication area when necessary. As such a system, for example, a system in which a person holds an active tag and a reader arranged at various places detects the position thereof, or a system that manages entering and leaving to/from a high-security area can be assumed. The tag is explained as an active tag; however, the tag is not limited to an active tag.

In a conventional active tag system, a reader adds a preamble with a length equal to or longer than the intermittent operation period T of the tag to data and transmits the data so that the tag can reliably receive a transmission frame from the reader. When the preamble is formed of a signal capable of distinguishing whether the signal is addressed to its own station, even if there is erroneous Wake Up due to noise or the like, the tag analyzes the preamble to determine that the signal is not addressed to its own station and returns to a sleep state to prepare for the next reception timing. However, when the preamble is a signal such as a CW, in the case of the erroneous Wake Up, it cannot be distinguish whether the signal is addressed to its own station by a preamble portion. Therefore, one intermittent operation period or more is required to distinguish that the signal is not addressed to its own station. Accordingly, a signal to be received at the next reception timing may not be received.

Figure 15:
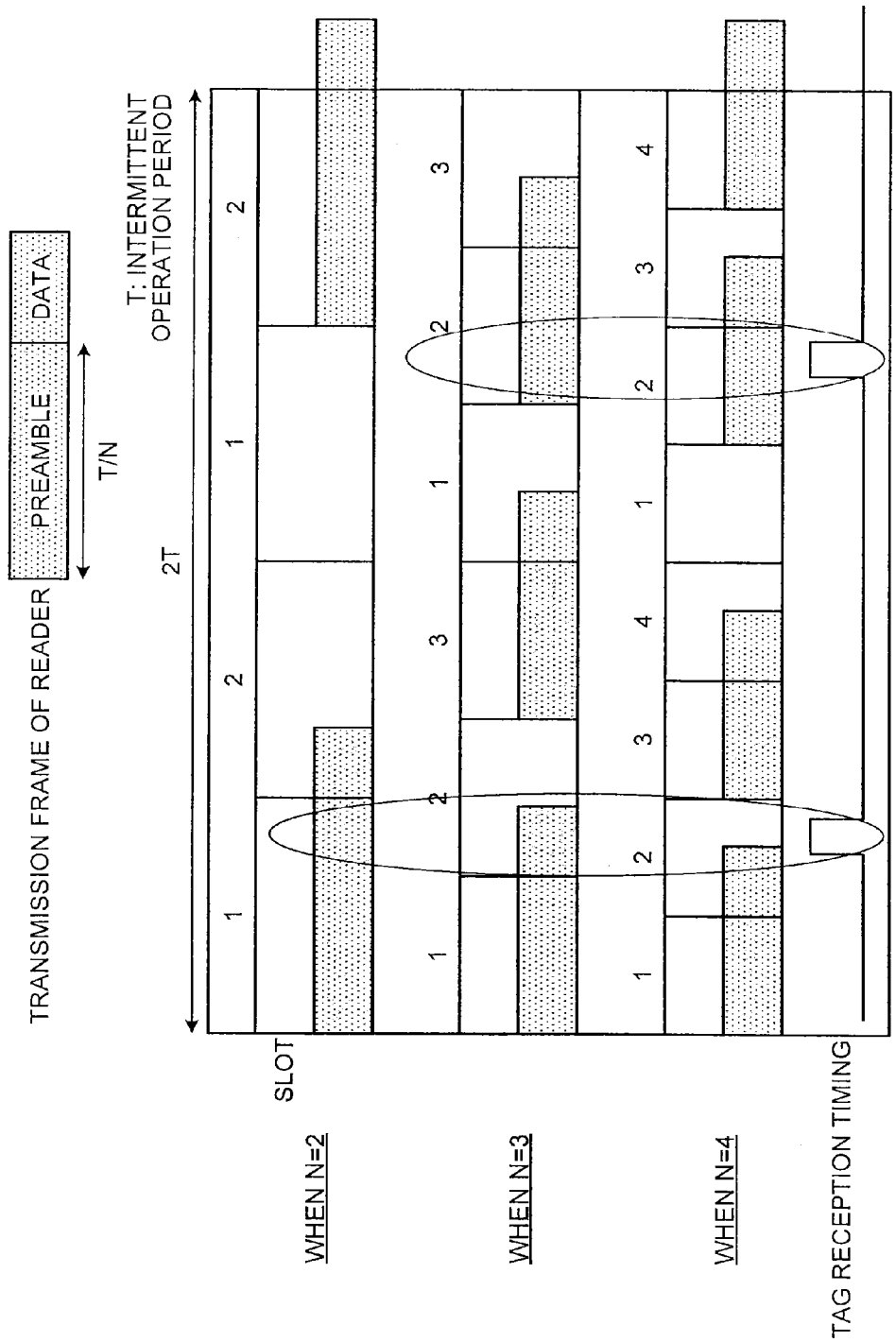
FIG. 15 is a diagram of an example of signal transmission by a reader according to a seventh embodiment.

FIG. 15 is a diagram of an example of a signal transmission by the reader according to the present embodiment. The reader transmits a frame, to which a preamble of T/N (N is an integer equal to or larger than 2) is added, N times, instead of transmitting a preamble with a length equal to or longer than T. In FIG. 15, examples in which N=2, 3, and 4 are shown. As shown in FIG. 15, the tag can surely receive a frame within the time 2T by setting a preamble length to T/N with respect to the intermittent operation period T of the tag, dividing the time T into N slots, and performing frame transmission N times while changing the slot to which the frame is transmitted within the time T so that one preamble is present in each slot within the time 2T. While the example where N=2, 3, and 4 is shown in FIG. 15, the value of N is not limited thereto.

The reader assumes that the tag can receive a certain frame among frames transmitted within the time 2T, and performs retransmission in one set of the time 2T. When transmission and reception of data is performed many times between the reader and the tag, the reader performs transmission as described above only for the first transmission. Thereafter, the reader can perform transmission matched with the timing when a response from the tag is received. By such transmission from the reader, even when the reader and the tag are not synchronized with each other and a frame shorter than the intermittent operation period is used, communication can be successfully performed within the time 2T. Furthermore, N may be made variable and the value of N may be switched depending on the status. For example, N is increased when the communication frequency can be low and N is decreased when the communication frequency is high.

In FIG. 15, a case where the data length is shorter than T/N, the length of data to be transmitted is sufficiently short with respect to T, and data is accommodated in each slot has been explained. However, the transmission method of the present embodiment can be also applied when the data length is longer than the slot.

FIG. 16 illustrates an example of signal transmission by a reader when the data length is equal to or longer than T/N and shorter than T, and FIG. 17 is a diagram of an example of signal transmission by a reader when the data length is equal to or longer than T and shorter than 2T. As shown in FIG. 16, when the data length is equal to or longer than T/N and shorter than T, in the case of N=2, the frame can be received within two periods, and in the case of N=3, the frame can be received within three periods. As shown in FIG. 17, when the data length is equal to or longer than T and shorter than 2T, in the case of N=2, the frame can be received within three periods. When the data length exceeds the length of one slot in this manner, it cannot be guaranteed that the frame can be surely received within two periods. However, by transmitting the frame N times so that one preamble is inserted into each slot number, the tag can still receive the frame within a certain period of time without fail. Further, in the transmission of N times, the frame does not need to be transmitted in the order of the slot numbers, and the order in which the frame is transmitted does not have to be in the order the slot numbers.

There is no particular limitation on the configurations of the reader and the tag according to the present embodiment as in the fourth embodiment. However, the configurations of the reader and the tag may be the same as those of the in-vehicle device and the mobile device according to any of the first to third embodiments, respectively, and the reception processing unit of the tag may be activated in one stage or other stages by using a Wake Up signal.

INDUSTRIAL APPLICABILITY

As described above, the in-vehicle communication system, the mobile device, the communication system, and the communication method according to the present invention are useful for a smart key system and a tag reader system, and are particularly suitable for a system that is directed to reduce power consumption of a mobile device.

REFERENCE SIGNS LIST 1, 1a, 1c in-vehicle device, 2, 2a, 2c, 2d mobile device, 11, 11a, 25, 25a microcomputer, 12, 24 modulation/demodulation circuit, 13, 21 transmission/reception antenna, 14 intermittent-operation-timing control unit, 15 modulation/demodulation and spreading/despreading circuit, 22 power detection circuit, 23 pattern determination circuit, 26 Wake-Up control unit, 27 reception-timing control unit, 28 BTR circuit, 29 code synchronization circuit, 30 modulation/demodulation and spreading/despreading circuit, 31 code synchronization/code identification circuit.

The invention claimed is:

1. A reader of a communication system comprising the reader and a tag that includes a reception processor that performs a reception process on a signal transmitted from the reader and that sets the reception processor to an activated state for a certain period of time with an intermittent operation period T, wherein
the reader transmits a transmission frame, which includes a preamble with a length of T/N (N is an integer equal to or larger than 2) and transmission data with a length shorter than T/N, N times within a time 2T such that transmission times do not overlap with each other.

2. The reader according to claim 1, wherein the N is variable.

3. A reader of a communication system comprising the reader and a tag that includes a reception processor that performs a reception process on a signal transmitted from the reader and that sets the reception processor to an activated state for a certain period of time with an intermittent operation period T, wherein
the reader transmits a transmission frame, which includes a preamble with a length of T/N (N is an integer equal to or larger than 2) and transmission data with a length equal to or longer than T/N, N times within a certain period of time such that transmission times do not overlap with each other.

4. The reader according to claim 3, wherein the N is variable.

* * * * *